March 8, 1966     J. H. MAYO     3,239,190
PLUG VALVE
Filed March 26, 1963
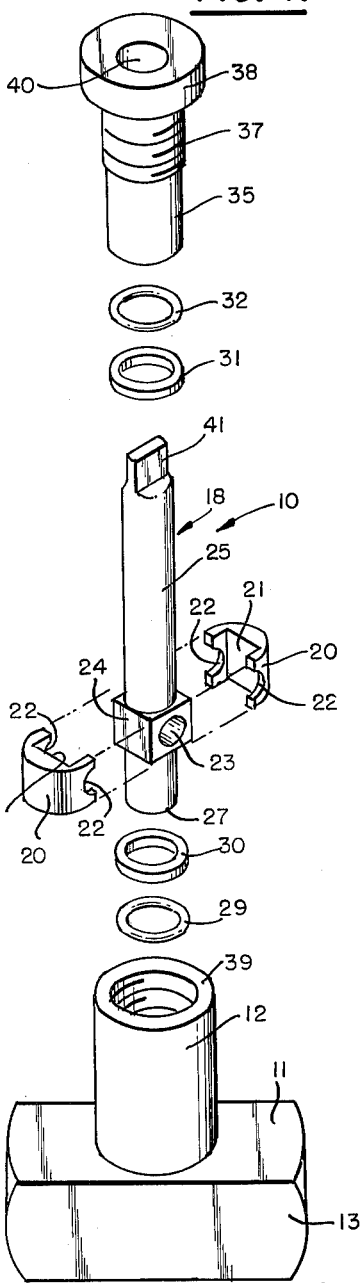
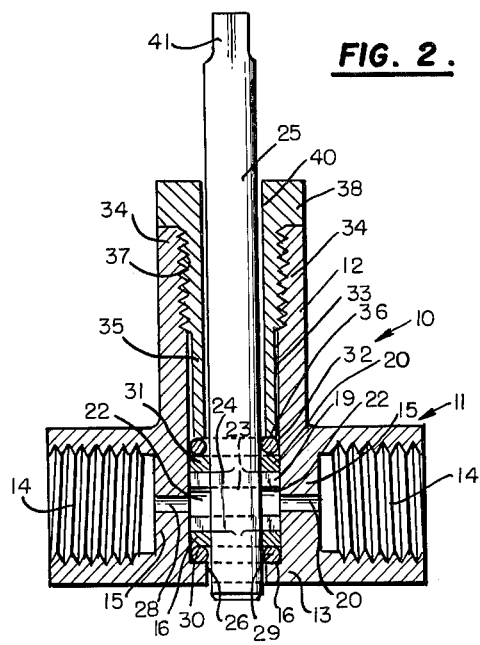
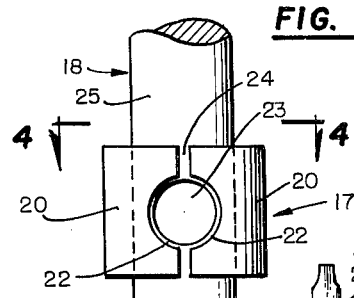
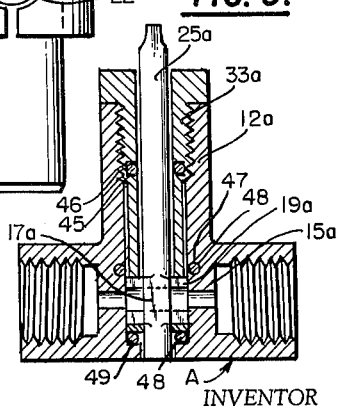
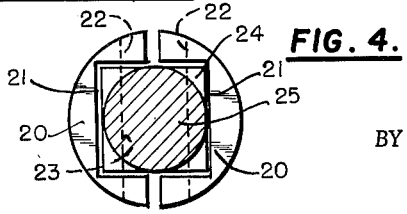
INVENTOR
John H. Mayo
BY    *Kimmel & Crowell*
ATTORNEYS United States Patent Office 3,239,190
Patented Mar. 8, 1966

3,239,190
PLUG VALVE
John H. Mayo, 406 Harding Drive, Houma, La.
Filed Mar. 26, 1963, Ser. No. 268,078
1 Claim. (Cl. 251—175)

This invention relates to a plug valve, and has as its primary object the provision of an improved plug valve characterized by a stem extending through the body and the plug, the valve stem having an opening therethrough, with O-rings positioned in the body on either side of the plug, thus balancing the valve and eliminating the need for bearings or thrust shoulders.

An additional object of the invention is the provision of a device of this character wherein the plug is separate from the stem thus permitting it to float until a pressure differential is established on one side or the other, thus effecting a seal in either direction with the valve in closed position.

A more specific object of the invention is the provision of a device of this character including a cylindrical plug comprised of two longitudinally split half sections, the arrangement being such that the plug may be manufactured with the same outside diameter as the inside diameter of the body or seat into which it fits. Fitting of the plug is insured by the removal of a small portion of the center of the plug along the line of the longitudinal split, permitting a close tolerance between the plug and seat when the sealing is effected.

An additional object of the invention is the provision of a valve of this character which need not be tapered, and which, by the arrangement described, effects a metal to metal seal with extremely close tolerance eliminating the necessity of grease filling or the like to complete the sealing.

Still other objects reside in the combinations of elements, arrangements of parts, and features of construction, all as will be more fully pointed out hereinafter and disclosed in the accompanying drawings wherein.

FIGURE 1 is an exploded perspective view of one form of plug valve embodying the instant inventive concept.

FIGURE 2 is an enlarged vertical sectional view taken through the assembled valve housing plug and stem.

FIGURE 3 is an enlarged fragmentary detail view showing the positioning of the plug on the end of the valve stem.

FIGURE 4 is a sectional view taken substantially along the line 4—4 of FIGURE 3 as viewed in the direction indicated by the arrows; and FIGURE 5 is a fragmentary view similar to FIGURE 2 but showing a modified arrangement of the sealing O-rings.

Similar reference characters refer to similar parts throughout the several views of the drawing.

Having reference now to the drawing in detail, one form of valve assembly constructed in accordance with the instant invention is generally indicated at 10 and includes a valve housing 11 which is of generally T-shaped configuration and includes a stem 12 and a cross head or piece 13. In the illustrative embodiment herein shown the cross head 13 is of generally rectangular configuration and is provided at its opposite ends with internally threaded bores 14 adapted for connection to suitable pipes or the like for the passage of fluid therethrough. Partitions 15 extend across the inner end of each bore 14 and are perforated by diametrically opposed transverse reduced bores 16 which extend into a common central chamber 19 in which the valve plug generally indicated at 17 and the valve stem generally indicated at 18, extend. The interior of the common or central chamber 19 is cylindrical in configuration. A rotatable valve stem 18 is insertable into and withdrawable from said chamber through one end of the latter and carries on the portion adjacent one end a substantially rectangular first portion or block 24 having a passage or bore 23 extending transversely therethrough. A valve plug, designated generally by the numeral 17, is formed of a pair of upright half sections 20 each being substantially C-shaped in vertical cross sectional configuration and each having a semi-cylindrical outer face and having a planar innerface 21 which abuttingly engages the adjacent planar face on the stem first portion or block 24 on the shank 25 of the stem 18. When in assembled condition, the ends of the sections 20 overlie the other faces of the block 24 and are cut away as at 22, to provide flow of fluid through the passage 23. When in assembled relation the ends of the upright sections are slightly spaced apart as shown clearly in FIGURES 3 and 4 to allow for thermal or other expansion and contraction of the valve assembly, and assure free rotation of the valve under all conditions.

A reduced bore 26 extends through the bottom wall of cross head 13, and accommodates the end 27 of valve stem 25 below the chamber 19. The bore 26 forms a shoulder 28 upon which is positioned an O-ring 29 upon which seats a washer 30, which is in turn engaged by the lower portion of valve plug 17. An opposite washer 31 is positioned on the top of plug 17 and surmounted by an O-ring 32 similar to the O-ring 30.

The stem 12 of housing 11 contains a smooth bore 33 which is threaded as at 34 at its upper extremity, and which accommodates sleeve having a smooth portion 35 terminating in an annulus 36 which compresses upper O-ring 32. The upper portion of the sleeve is threaded as at 37 and engages the internal threads 34 so that it may clamp tightly against O-ring 32. An end flange 38 seats on the top 39 of stem 12 and precludes excessive compression or binding of the O-rings to an extent to preclude the turning of valve stem 25 which extends outwardly through the central bore 40 of the sleeve. The upper end of valve stem 25 is suitably flattened or otherwise formed to receive a handle as indicated at 41.

FIGURE 5 discloses a slightly modified form of construction wherein a valve stem 25a extends through a sleeve 33a and is provided with a valve plug 17a all identical in construction to the members previously described corresponding thereto, into a chamber 19a between apertured partitions 15a in a T-shaped housing 11a. In this construction, however, a slightly modified sealing is effected in that a first or upper sealing ring 45 is positioned in a groove 46 interiorly of sleeve 33a and a second upper sealing ring 47 is positioned in a groove 48 in the interior of stem 12a of the housing, sealingly engaging the outer side of sleeve 33a. A lower O-ring 48 is similarly positioned in a groove 49 formed in the lower portion of a housing below the plug 17a. The arrangement is substantially identical to that of the previously described except for the positioning of the sealing or O-rings.

From the foregoing the use and operation of the device should now be readily apparent. When the valve stem 25 is turned so that the passage 23 and the aligned openings 22 are perpendicular to or disaligned from the associated bores 16, the valve is closed by an effective metal to metal seal between the outer surfaces of the plug sections 20 and the adjacent inner surface of the cylindrical bore or chamber 19. When the valve is turned to a position wherein the openings 22 in the bore 23 are aligned with the bores 16, free passage of fluid between the openings 14 is provided. Since the plug 17 or the associated half sections 20 thereof are freely movable linearly about the block 24, except as limited by the washers 30 and 31, pressure is effectively equalized on either side of the plug so that a free floating effect is achieved, the O-rings effectively serving to seal the valve against leakage, and the equalization of pressure on opposite sides of the plug readily permitting relatively easy rotation thereof to open or closed position.

Since many embodiments may be made of this inventive concept, and since many modifications may be made in the embodiment hereinbefore shown and described, it is to be understood that all matter herein is to be interpreted merely as illustrative, and not in a limiting sense.

I claim:

A plug valve construction including a valve housing having a substantially cylindrical chamber therein with a valve stem opening extending axially of said cylindrical chamber and open at its outer ends, said housing including a pair of aligned diametrically opposed transverse bores, a valve stem in said valve stem opening including an end portion extending exteriorly of said housing through at least one of the open outer ends of said valve stem opening and a rectangular block having a transverse bore therethrough on said valve stem in said cylindrical chamber, a pair of substantially C-shaped half sections each having a semi-circular outer surface conforming to the configuration of said cylindrical chamber, and an inner surface defining a squared chamber encompassing substantially one-half of said rectangular block, each half section including a top and bottom portion and a pair of end portions, the end portions each having at semicircular opening therein so positioned that the end portions of said half sections when aligned about said block define circular openings about the ends of said transverse bore through said block, the ends of said half sections being slightly spaced apart when aligned about said block, washers and O-rings positioned in said cylindrical chamber on opposite sides of said top and bottom portions of said half sections, and means securing said washers and O-rings yieldably in contact with the top and bottom portions of said half sections.

References Cited by the Examiner

UNITED STATES PATENTS

| | | | |
|---|---|---|---|
| Re. 25,251 | 10/1962 | Quail | 251—172 |
| 1,166,300 | 12/1915 | Yergens | 251—283 |
| 2,391,278 | 12/1945 | Stark | 251—102 |
| 2,845,248 | 7/1958 | Fuglie | 251—175 |
| 2,885,179 | 5/1959 | Hartmann | 251—315 |
| 3,100,501 | 8/1963 | Hansen et al. | 251—171 X |

FOREIGN PATENTS 867,610  5/1961  Great Britain.

M. CARY NELSON, *Primary Examiner.*

LAVERNE D. GEIGER, *Examiner.*